United States Patent [19]

Weiss

[11] 3,745,249

[45] July 10, 1973

[54] REGENERATIVE TRANSMISSION SYSTEM FOR DIGITAL SIGNALS

[75] Inventor: Reinhold Weiss, Munich, Germany

[73] Assignee: Krone GmbH, Berlin-Zehlendorf, Germany

[22] Filed: June 21, 1971

[21] Appl. No.: 155,351

[30] Foreign Application Priority Data

June 19, 1970 Germany .................. P 20 30 418.1

[52] U.S. Cl. .............................................. 178/70 R

[51] Int. Cl. .............................................. H04l 25/20

[58] Field of Search ..................................... 178/70 R

[56] References Cited

UNITED STATES PATENTS

| | | | |
|---|---|---|---|
| 3,476,879 | 11/1969 | Zenner | 178/70 R |
| 3,491,298 | 1/1970 | Jager | 178/70 R |
| 3,502,985 | 3/1970 | Hata | 178/70 R |

*Primary Examiner*—Kathleen H. Claffy
*Assistant Examiner*—Thomas D'Amico
*Attorney*—Karl F. Ross

[57] ABSTRACT

A repeater for binary signals, inserted in a transmission path, includes in its input circuit a narrow-band filter with a pass band whose midfrequency substantially equals half the basic pulse cadence 1/T whereby any change in signal voltage from "0" to "1" or vice versa gives rise to a sinusoidal half-cycle of one or the other polarity. The two polarities are separated to yield two unipolar pulse trains which are passed through respective low-pass filters cutting off above the aforementioned midfrequency whereby the pulses of each train are broadened to substantially double their original width and high-frequency noise is largely excluded. As the trough between two consecutive pulses of one train always coincides with a pulse of the other train, a cap clipped off the last-mentioned pulse may be added to the first train to deepen the trough and to improve the signal-to-noise ratio. A succession of sync pulses, derived from the incoming signals, serves to enable a flip-flop for alternate setting and resetting by respective pulses from the two unipolar trains whereby a replica of the original binary message is generated in the output of that flip-flop.

12 Claims, 13 Drawing Figures

Patented July 10, 1973

3,745,249

6 Sheets-Sheet 1

Binary Code

Bipolar Code

Di-Pulse Code

REGENERATIVE TRANSMISSION SYSTEM FOR DIGITAL SIGNALS

My present invention relates to a system for the regenerative transmission of digital signals, more particularly binary code words or bit combinations, conventionally represented by a recurrent switchover between a first and a second voltage level (one of which may be zero).

As is well known, code words composed of a predetermined number of bits can be used to represent the digital equivalent of the instant analog values of a message signal transmitted by the so-called pulse-code-modulation (PCM) system. Reference in this connection may be made, for example, to an article by B.M. Oliver, J. R. Pierce and C.E. Shannon, The Philosophy of PCM, Proc. IRE, November 1948.

For transmission over greater distances, by cable and/or radio links, it is generally necessary to insert one or more repeaters in the signal path for the purpose of regenerating the original bits which unavoidably undergo a certain amount of distortion in their propagation. Generally, the repeater must discriminate between the two amplitude levels denoting the binary values "0" and "1," respectively; frequently, though not necessarily at every stage of regeneration, it will also be desirable to restore the relative time position of the bits which may become somewhat blurred by a certain rounding of the pulse flanks, particularly if the coupling between the signal generator or repeater and the adjoining line section (in the case of a metallic transmission path) is reactive rather than galvanic. Such reactive coupling, however, is often employed to eliminate the necessity for a common ground for the several line sections and to permit, if desired, the use of supervisory d-c signals independent of the transmitted bits.

The operation of a conventional repeater in a PCM system is described, for example, in an article by M.R. Aaron, entitled "PCM Transmission in the Exchange Plant," Bell System Techn. Journal, January 1962. This article also discusses the generation of a train of timing or synchronizing pulses, locked in with the basic rhythm of the incoming code pulses, for the purpose of re-establishing the original pulse width (hereinafter designated T) in the repeater output.

Nevertheless, the reactive distortion of inductively or capacitively transmitted pulses leads to a phenomenon known as "zero drift" which manifests itself in a progressive decay of the relative amplitude, particularly if several pulses of like polarity follow one another in uninterrupted succession. The pulse amplitude may then drop below the critical level which the discriminator of the repeater assigns to binary value "1" so that one or more of these pulses may be erroneously registered as "0." This phenomenon can also be interpreted as the suppression of a significant d-c component (zero-frequency Fourier term) of the binary signal by a system incapable of transmitting direct current. Means have been proposed for restoring the suppressed d-c component in the repeater (cf. K.R. Wrathall, Transistorized Binary Pulse Regenerator, Bell System Techn. Journal, September 1956, pages 1062 – 1064), yet the equipment needed for this purpose is highly complex and subject to noise interference.

There have also been proposals for the avoidance of the aforedescribed drawbacks by the substitution of modified codes for the basic binary code, such as the co-called bipolar code (see the above-identified Aaron article, pages 125 and 126) and a variant hereinafter referred to as di-pulse code (described by H. Kaden, Theoretische Grundlagen der Datenubertragung, Oldenburg-Verlag 1968, pages 57, 58). As will be shown in greater detail hereinafter, the bipolar code is susceptible to distortion by low-frequency noise (e.g. the hum of nearby power lines) whereas the di-pulse code is liable to interference by higher extraneous frequencies, such as signals from an adjoining transmission channel.

It is, therefore, the object of my present invention to provide an improved regenerative transmission system which avoids the disadvantages inherent in both the basic binary system and its various modifications proposed heretofore.

With this object in view, my invention provides for the use of one or more repeaters each comprising an input circuit for incoming binary signals subject to distortion and an output circuit for the retransmission of such signals in regenerated form, the input circuit including a filter stage (advantageously a damped resonant circuit) which cuts off all frequencies substantially lower than ½T whereby voltage changes from the first to the second level give rise to sinusoidal half-cycles of one polarity (e.g. positive) whereas voltage changes from the second to the first level similarly generate sinusoidal half-cycles of the opposite polarity (e.g. negative); since in the incoming binary signal a switchover from first to second level is invariably followed by a return to the first level and so forth, the half-cycles of opposite polarities alternate in the repeater output and follow one another with or without separation by low-level voltages, depending on the duration of the switchover intervals in the original signal. A bistable element or flip-flop in the output circuit of the repeater is settable by half-cycles of one polarity and resettable by half-cycles of the other polarity to regenerate the original bits.

The aforementioned low-level intervening voltage, separating half-cycles of opposite polarity, comes into existence with switchover intervals substantially greater than T. Ideally, this intervening voltage has zero magnitude, yet in practice this will generally not be the case. Another feature of my invention, therefore, provides for superimposing upon the succession of alternately positive and negative half-cycles a slowly varying mean voltage, obtained from the output of the filter stage with the aid of an integrating network, with a polarity designed to compensate sugstantially for any deviation of the intervening voltage from zero.

According to another feature of my invention, and with a view to improving the signal-to-noise ratio, my system advantageously includes non-linear impedence means (such as a pair of diodes) between the input and output circuits of the repeater for splitting the sequence of alternate half-cycles into two unipolar pulse trains of opposite polarity which are fed to the flip-flop via separate signal paths. Each of these signal paths may include a low-pass filter with a cutoff frequency substantially at or below ½T for broadening the unipolar pulses of each train to at least twice their original width prior to their application to the flip-flop; higher noise frequencies are thereby largely suppressed. Furthermore, I may provide a clipping stage in cascade with the low-pass filters for cutting caps of maximum width T from the unipolar pulses of either polarity; these caps are then superimposed upon the unipolar pulse trains of respectively opposite polarity to increase the effective separation of their consecutive pulses, thereby allowing the use of less sensitive amplitude detectors in the repeater.

A repeater according to my invention may further include a synchronizing-pulse generator, of the aforedescribed type known per se, working into the aforementioned flip-flop for the purpose of periodically enabling same to respond to either a setting or a resetting pulse from the output of the filter stage.

The above and other features of my invention will be described in greater detail hereinafter with reference to the accompanying drawing in which:

FIG. 1*a* is a graph illustrating a series of bits corresponding to the conventional binary code;

FIG. 1*b* is a graph similar to FIG. 1*a*, illustrating a conversion of the same signal into a bipolar code;

FIG. 1*c* is another graph showing conversion to the di-pulse code;

FIG. 1*d* is a table and FIG. 1*e* is a curve diagram comparing the codes of FIGS. 1*b* and 1*c* with the code generated in a repeater according to my invention;

Figure 4:
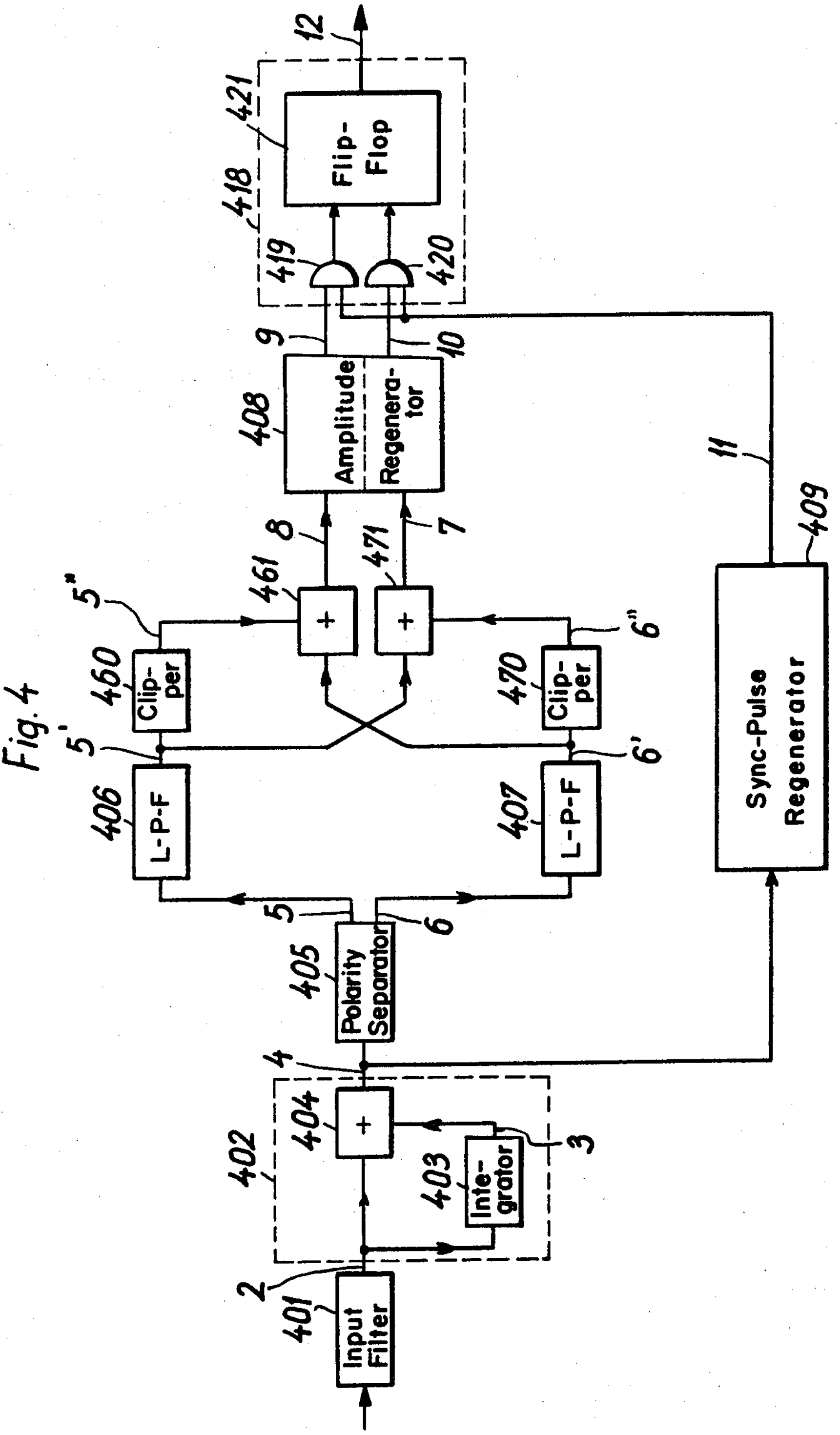
FIG. 4 is a still more detailed block diagram of a repeater as shown in FIG. 3.
Figure 6A:
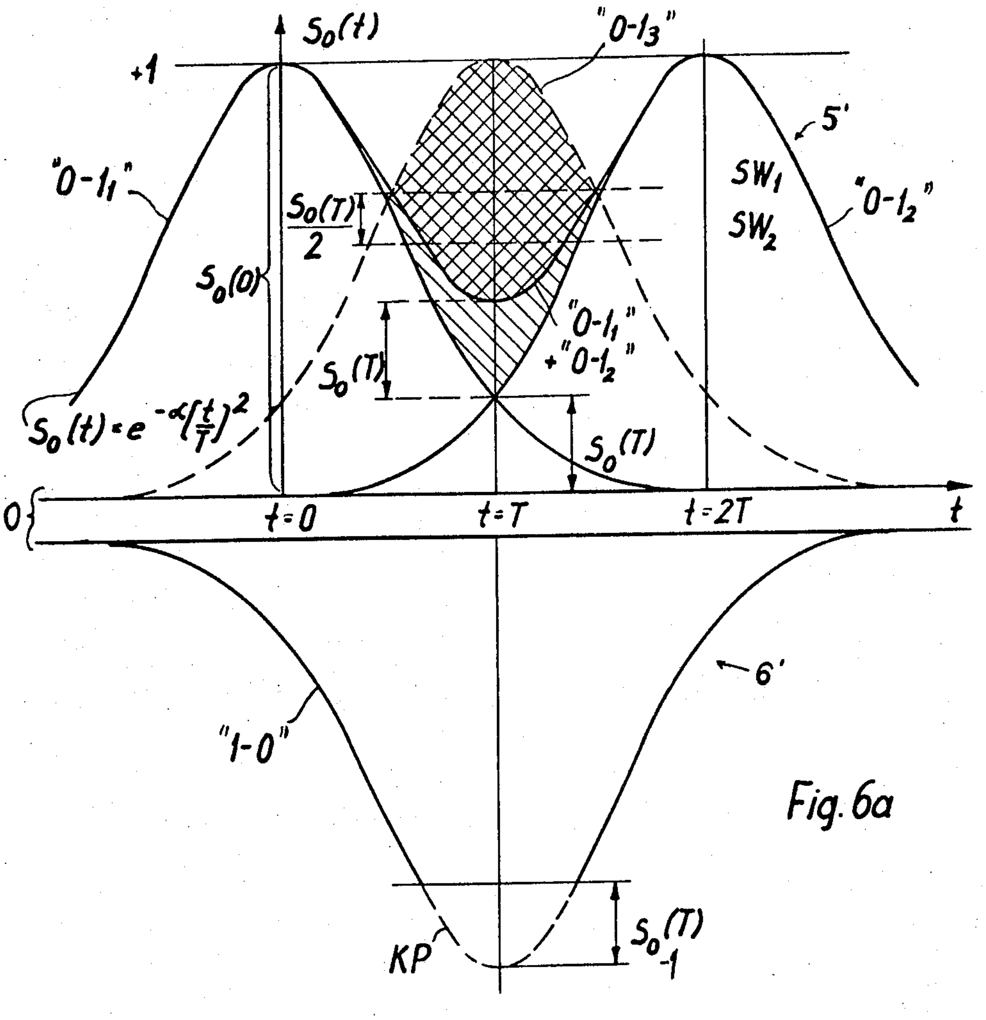
Figure 6B:
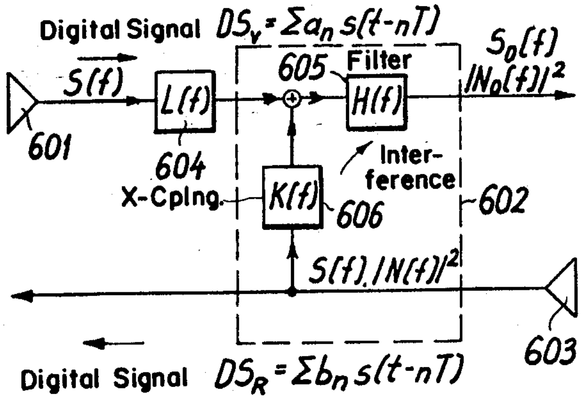
Figure 7A:
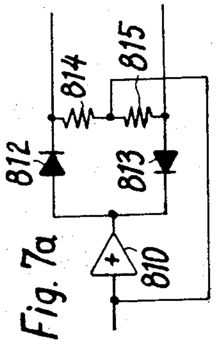
Figure 7:
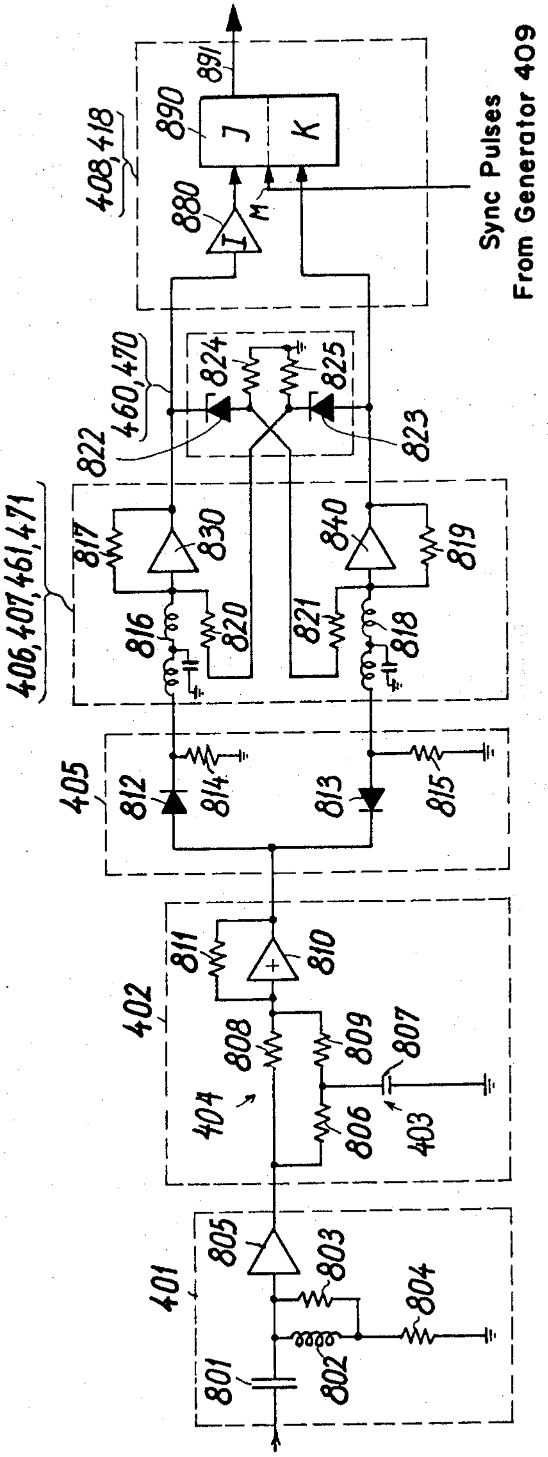

FIG. 6*a* is a curve diagram serving to explain the operation of one of the stages of the repeater;

FIG. 6*b* is a schematic serving for the analysis of the mode of operation of the input stage of the repeater;

FIG. 7 is a detailed circuit diagram of some of the elements shown in FIG. 4; and FIG. 7*a* shows a partial modification of the circuit of FIG. 7.

Figure 1A:
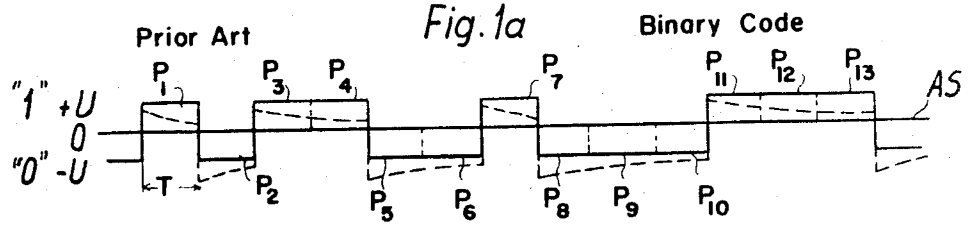
Fig. 1a Prior Art

In FIG. 1*a* there is shown a sequence of binary code pulses or bits $P_1$, $P_2$ etc., of positive and negative polarity +U and −U respectively representing the digital values "1" and "0." The mean value of these voltage pulses, when integrated over a sufficient length of time, is substantially zero; over the short run, however, an appreciable d-c component is present, particularly where several pulses of the same polarity immediately follow one another, as at $P_8 - P_{10}$ and $P_{11} - P_{13}$. With reactive coupling as discussed above, therefore, these pulses decay in amplitude toward the 0 level as indicated in dotted lines. Since the switchover from one polarity to the other entails a voltage step of substantially invariable magnitude, the mean level of the pulses tends to deviate from the actual zero line AS. Owing to this deviation, the absolute pulse amplitude may become so low that a discriminator stage receiving these pulses may fail to detect a pulse of one or the other polarity. (If, say, the negative pulses were replaced by zero voltage, the discriminator could misread low-amplitude positive pulses for the absence of a pulse and, hence, for a "0" bit.) Thus, substantial information may be lost with both the unipolar and bipolar versions of the code of FIG. 1*a*.

Figure 1B:
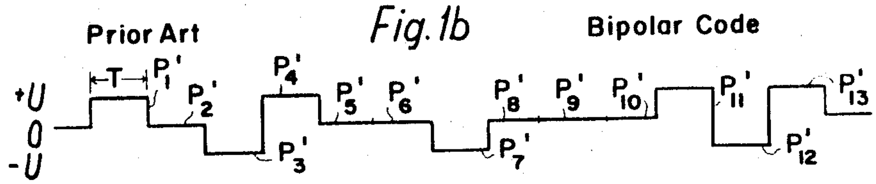
Fig. 1b Prior Art

The bipolar code of FIG. 1*b* is of the ternary rather than the binary type, requiring the transmission of three distinct voltage levels +U, 0 and −U. This code is derived from that of FIG. 1*a* by assigning zero voltage to the binary value "0" and alternating between voltage levels of opposite polarity to indicate consecuitve bits "1". The means voltage level here is 0 even with short-term integration so that the aforedescribed zero drift is substantially eliminated.

Figure 1C:
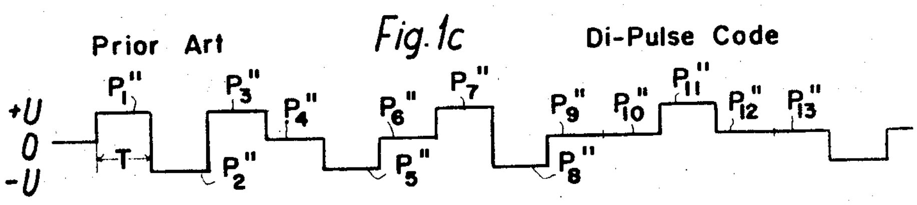
Fig. 1c Prior Art
Figure 1D:
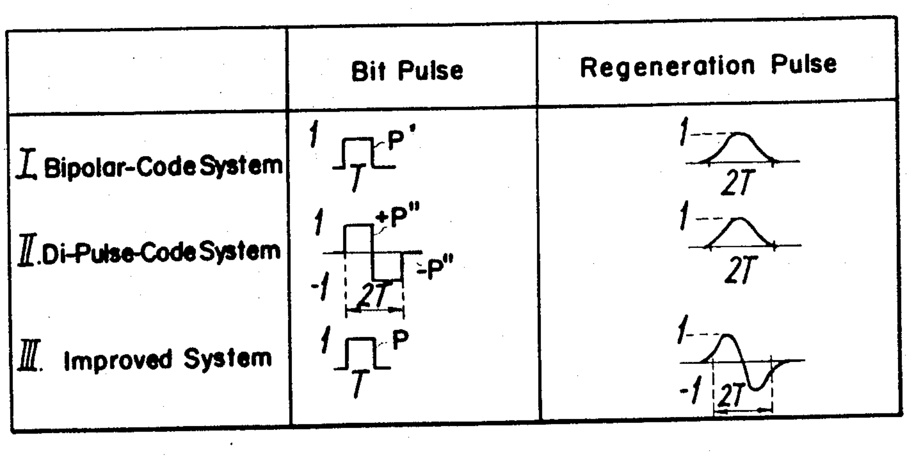

In the processing of the pulses $P_1'$, $P_2'$ of FIG. 1*b*, as described in the aforecited Aaron article, a square pulse P′ is broadened within the repeater into a Gaussian regeneration pulse of base width 2T, illustrated in row I of FIG. 1*d;* this requires a repeater with an input filter of reduced lower cutoff frequency which permits the superposition of low noise frequencies upon the digital signals and therefore impairs the signal-to-noise ratio defined by the relationship $$Q[dB] = 10^{10} \log S/N$$

where S is the signal power and N is the noise power.

The di-pulse code of FIG. 1*c*, including pulses $P_1''$, $P_2''$ etc., is also of the ternary type and is derived from the code of FIG. 1*a* by converting a leading edge of the latter (e.g. the rising flank of pulse $P_1$) into a positive pulse (e.g. $P_1''$) and a trailing edge (e.g. the falling flank of pulse $P_1$) into a negative pulse (e.g. $P_2''$) while registering a voltage of 0 if the value of the binary pulse does not change (e.g. as between pulses $P_3$ and $P_4$, giving rise to zero-voltage pulse $P_4''$). Here, again, the mean voltage is substantially zero even with short-term integration; the rapid succession of square pulses of width T, however, calls for a high upper cutoff frequency of the receiving filter so that the system is susceptible to high-frequency noise. Moreover, false operation for an extended period may result from an accidental suppression or substantial diminution of a positive or negative pulse, e.g. the pulse $P_{11}'$ in which case there would be a false indication of binary value "0" not only at $P_{11}'$ but also at the next two pulses $P_{12}''$ and $P_{13}''$.

As illustrated in FIG. 1*d*, row II, the processing of pulses +P″, −P″ in the di-pulse-code system of FIG. 1*c* also involves the creation within the repeater of a Gaussian regeneration pulse of base width 2T; again, therefore, the nether cutoff frequency of the input filter must be relatively low.

In contradistinction thereto, and as more fully described hereinafter, the repeater according to my present invention derives from an incoming code pulse P (forming part of a binary code as shown in FIG. 1*a*) a pair of mutually symmetrical regeneration pulses of opposite polarity generally representing respective half-cycles of a sinusoidal wave of period 2T; see row III of FIG. 1*d*. As shown in that Figure, and as assumed by way of example in the ensuing description, the code pulses P are of positive polarity to denote the binary value "1"; their leading and trailing edges give rise to positive and negative regeneration pulses, respectively.

Figure 1E:
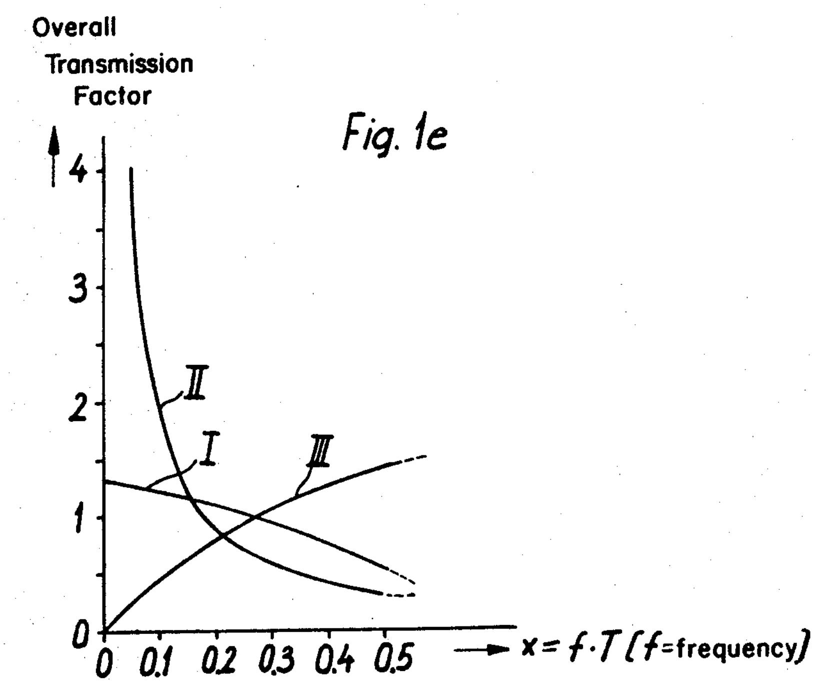

The overall transmission factor F of a repeater may be defined, as a function of frequency *f*, by the relationship $$F(f) = A(f)/E(f)$$

where A(*f*) and E(*f*) are the Fourier transforms of the regeneration pulse and of the bit pulse, respectively, for a given frequency *f*. This transmission factor F has been plotted in FIG. 1*e* against a parameter $x = fT$ for the three transmission systems discussed in connection with FIG. 1*d*, the corresponding graphs being labeled in FIG. 1*e* by the same Roman numerals I, II, III as are used to identify these systems in the preceding Figure. For purposes of this comparative presentation, the transmission path leading to the repeater is assumed to be free from distortion.

It will be noted that the present system (graph III) is superior to both the bipolar-code system (Graph I) and the di-pulse-code system (graph II) as far as the suppression of frequencies lower than about one-fourth the basic pulse cadence 1/T is concerned; with T = 500 nsec, for example, corresponding to a pulse cadence of 2 MHz, frequencies below 500 kHz are effectively attenuated.

The system embodying my invention has the further advantage of using the conventional binary code along the transmission path ahead of and beyond the repeater, which (as established by a simple Fourier analysis) entails a concentration of the signal energy mainly in the lower frequency ranges; the bandwidth of the signal path, therefore, may be substantially less than for the aforedescribed ternary codes. Also, with a given signal amplitude, the signal power of the present system exceeds that of these ternary systems and affords thereby increased protection against interference, especially against parasitic signals not originating in adjoining systems of like character. The danger of serial error, as described above with reference to FIG. 1*c*, is greatly reduced.

The input filter of my improved repeater, with its high impedance for low frequencies, helps reduce the distortion of the incoming signals so as to eliminate the need for a separate linearization stage.

Reference will now be made to FIGS. 2 – 7 for a description of a preferred embodiment.

Figure 2:
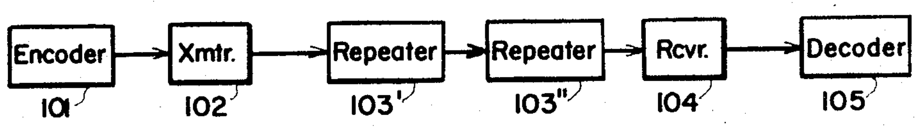
FIG. 2 is a block diagram of a PCM transmission system utilizing several repeaters according to the invention.

FIG. 2 shows the overall layout of a PCM transmission system including several repeaters according to the invention. The transmission path originates at an encoder 101, translating the analog values of a desired message into bits, which works into a transmitter 102 feeding a metallic or radio channel wherein several repeaters 103', 103'' are inserted at spaced-apart locations. A receiver 104, following the last repeater, works into a decoder 105 which restores the original message. The repeaters are designed to maintain the highest fidelity possible in the reproduction of the transmitted signals.

Figure 3:
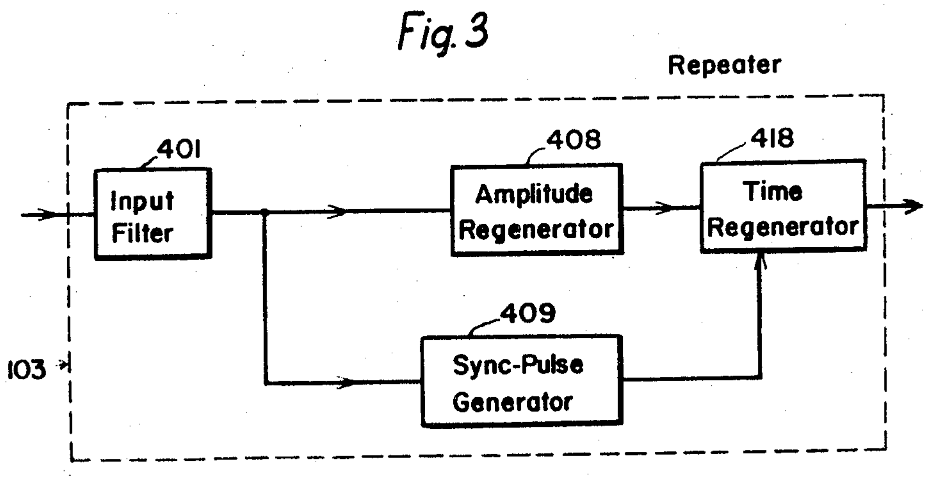
FIG. 3 is a more detailed diagram of a repeater shown in FIG. 2.

In FIG. 3 I have shown a repeater 103 representative of either of the two repeaters 103', 103'' illustrated in FIG. 2. The repeater comprises, essentially, an input filter 401, an amplitude regenerator 408 supplied by that filter in parallel with a conventional sync-pulse generator 409, and a time regenerator 418 jointly controlled by the amplitude regenerator 408 and the sync-pulse generator 409. Regenerator stage 408 has a predetermined amplitude threshold in order to discriminate between voltages (of either polarity) above and below that level, delivering an output to regenerator stage 418 in the first case but not in the second. The voltages sensed by stage 408 have the general form of the sinusoidal regeneration pulses illustrated in row III of FIG. 1*d*, except that half-cycles of opposite polarity need not follow each other immediately (as shown in that Figure) but may be separated by near-zero intervening voltages as illustrated in graphs 2 and 4 of FIG. 5 described hereinafter. As the relative time positions of the sloping flanks of these half-cycles are not precisely defined, the synchronization pulses generated by unit 409 serve to establish the leading and trailing edges of the outgoing bits in the rhythm of the original signals though with a certain lag relative thereto. Pulse generator 409 picks up the fundamental frequency of the modified sine wave in the output of filter 401 to produce a set of spikes (graph 11 in FIG. 5) exactly separated by the pulse width T.

FIG. 4 shows a more elaborate version of the repeater of FIG. 3 wherein additional components, designed to improve the signal-to-noise ratio of the regeneration pulses, have been inserted between filter 401 and regenerator stage 408. Numerals 1 – 12 in FIG. 4 refer to the graphs so numbered in FIG. 5 which depict the various signals entering and leaving the several repeater components.

Filter 401, whose construction is more fully illustrated in FIG. 7 described below, is essentially a damped series-resonant circuit tuned to the frequency ½T so as to convert the incoming binary signals 1 into a quasi-sinusoidal wave 2. Signal 1 of FIG. 5 will be recognized as identical with the pulse train $P_1 - P_{13}$ of FIG. 1*a;* the distortion of the original pulse shape (full lines) due to reactive coupling, as discussed above, has again been indicated in dotted lines representing the actual incoming signals 1'. Wave 2, with its alternately positive and negative half-cycles, has a mean voltage of substantially zero; owing to the aforementioned reactive coupling, however, the symmetry of this wave about the 0 axis is somewhat impaired by the overswing occurring, as indicated at 2', whenever a half-cycle of one polarity is not immediately followed by a pulse of the opposite polarity. This overswing affects the amplitude of the latter pulse, following after a switchover interval of duration *n*·T (*n* being an integer), and thereby reduces the effective signal-to-noise ratio.

In order to eliminate the overswing, I provide just beyond the input filter 401 a compensating stage 402 which includes an integrating network 403 for deriving from the wave 2 a slowly varying means voltage 3 which has the proper polarity to counterbalance the zero shift of that wave when superimposed thereon in an analog adder 404 also receiving the wave 2 directly from filter 401. The resulting corrected wave 4 is precisely centered on the 0 axis. This wave 4 is now fed, on the one hand, to sync-pulse generator 409 and, on the other hand, to a separating stage 405 whose nonlinear impedances split its positive and negative pulses into two unipolar pulse trains 5 (positive) and 6 (negative) which are fed over separate channels to the amplitude regenerator 408. The presence of a low-pass filter 406, 407 in each of these channels, cutting off at or somewhat below ½T, broadens the base width of the unipolar pulses to generate a pair of modified pulse trains 5' and 6' (full lines) wherein the most closely spaced pulses of trains 5 and 6 blend into generally sinusoidal wave shapes. This blocks the transmission of high-frequency noise which may be picked up at the repeater station from other signal paths; in particular, the fundamental frequency ½T of a succession of binary code pulses of width T can be effectively attenuated by choosing a sufficiently low cutoff frequency, yet this will cause a partial merger of the roots of adjoining pulses so as to create a relatively shallow trough between immediately consecutive peaks. To deepen that trough, for the purpose of establishing an optimum signal-to-noise ratio, I provide a pair of clippers 460, 470 just beyond filters 406, 407 whose operation, more fully described below, cuts a positive cap 5'' and a negative cap 6'' from each peak of train 5' and 6', respectively. Two analog adders 461, 471 superimpose the positive caps 5'' upon the negative pulse train 6' passed by filter 407 and the negative caps 6'' upon the positive pulse train 5' passed by filter 406, thereby producing pulse trains 8 (negative) and 7 (positive) differing from the trains 6' and 5' at the locations indicated in dotted lines in the corresponding graphs of FIG. 5. Trains 7 and 8 are fed to respective inputs of amplitude regenerator 408 which gives rise to positive and negative square pulses 9, 10 whenever the absolute value of the voltage of these trains surpasses a positive threshold $+SW_2$ or a negative threshold $-SW_2$ whose significance will be explained with reference to FIG. 6a. Finally, in response to the sync pulses 11 delivered together with pulse trains 9 and 10 to a pair of AND gates 419, 420 within time regenerator 418, a flip-flop 421 in that regenerator is alternately set and reset to produce the outgoing pulses 12 constituting a replica of the incoming pulses 1.

The graph of FIG. 6a, which in view of its shape may be termed an "eye diagram," shows two overlapping pulses of the positive train 5' and an intervening pulse of the accompanying negative train 6'. The positive pulses, due to two consecutive switchovers of the incoming signal from "0" to "1," have been designated "$0-1_1$" and "$0-1_2$," respectively; the negative pulse, arising from a reverse switchover, has been labeled "1-0." The merged roots of the two positive pulses have been indicated at "$0-1_1$" + "$0-1_2$" and define a shallow trough centered on the time $t=T$, which marks the peak of the negative pulse "1-0," the positive peaks occurring at times $t = 0$ and $t = 2T$, respectively. The amplitude $S_o(t)$ of pulse "$0-1_1$" is assumed to follow a Gaussian law given by the expression $$s_o(t) = e^{-\alpha \ (t/T)^2}$$

with $\alpha = 1.5$; for the pulse "$0-1_2$" the same formula applies with replacement of $t$ by $t-2T$.

According to this formula, the peak amplitude of these pulses is +1 (that of pulse "1-0" being -1); if we consider the base of each pulse as the level where $|s_o(t)| = 0.1$, its base width will be seen to be well in excess of 2T. At $t = T$, midway between the two overlapping pulses, the amplitude of pulse "$0-1_1$" is $s_o(T)$, the same as that of pulse "$0-1_2$"; because of the overlap, therefore, the combined amplitude of the resultant wave form at the bottom of the trough is $2s_o(T)$. Thus, the amplitude discriminator 408 of the repeater would have to be capable of distinguishing between two levels differing, even in absence of noise interference, only by $1-2s_o$ (T) which is the height of an "eye" (cross-hatched area) bounded by the curve "$0-1_1$" + "$0-1_2$" and by an imaginary third positive pulse "$0-1_3$" (dotted lines) constituting the mirror image of the negative pulse "1-0" actually present at that time. The operating threshold of the discriminator would then have to lie at a level $SW_1$ passing through the center of the "eye".

The clipper 471 cuts off a cap KP, of a depth equal to $s_o(T)$ and of a width not greater than T, from the negative pulse "1-0" for superposition in adder 471 (as a voltage surge 6'') upon the positive train 5' as indicated by the diagonally shaded area of FIG. 6a. This measure lwwers the bottom of the trough at $t=T$ by the value $s_o(T)$ and correspondingly drops the threshold of the discriminator by $s_o(T)/2$ to a level $SW_2$. In an analogous manner, clipper 460 and adder 472 modify the shape of the negative train 6' by the superposition thereon of caps 5'' clipped from positive pulses of train 5'. This action establishes the two amplitude thresholds $+SW_2$ and $-SW_2$ in graphs 5' and 6' of FIG. 5.

If consecutive pulses of the same train 5' or 6' are more widely spaced, with their peaks separated by a multiple of 2T, the superimposition of the caps clipped from the other train merely results in an ineffectual local depression of the substantially horizontal base line between these pulses as indicated at 7a and 7b in graph 5'.

Reference will now be made to FIG. 6b for a quantitative analysis of the improvement in signal-to-noise ratio realized with the several measures just described. This Figure shows two adjacent transmission channels, supplied by respective repeaters 601 and 603, for sending digital signals $DS_V$ in a forward direction and $DS_R$ in a reverse direction. The signal $DS_V$ can be mathematically represented by the relationship $$DS_V = \Sigma\, a_n \cdot s(t-nT) \qquad (1)$$

wherein $a_n$ has the value ±1 and $s(t)$ signifies the pulse shape; its Fourier spectrum is $S(f)$. After traversing a section 604 of its channel having a transmission factor $L(f)$, signal $DS_V$ reaches the input circuit 602 of the repeater next in line which includes a filter stage 605 with a transmission factor $H(f)$; this circuit also establishes an unavoidable cross-coupling 606, with a transmission factor $K(f)$, between the two channels. Filter stage 605 delivers the aforedescribed regeneration signal $s_o(t)$ having a Fourier spectrum $S_o(f)$.

The oppositely traveling signal $DS_R$, having the same Fourier spectrum $S(f)$, can be similarly represented by the relationship $$DS_R = \Sigma\, b_n \cdot s(t-nT) \qquad (2)$$

with $b_n$ having the value ±1. The noise spectrum $N_o(f)$ due to cross-talk via coupling 606 is given as $$|N_o(f)|^2 = (1/T)\,|S(f) \cdot K(f) \cdot H(f)|^2 \qquad (3).$$

From the relationship $S_o(f) \cdot L(f) \cdot H(f)$, which is apparent from FIG. 6b, the total noise power $P_R$ due to the interfering cross-talk can be expressed by $$P_R = \int_{-\infty}^{+\infty} |N_o(f)|^2 df = \frac{1}{T} \int_{-\infty}^{+\infty} |K(f) \cdot S_o(f)/L(f)|^2 df \qquad (4)$$

The useful signal power $P_S$ at the instant of evaluation can be calculated as $$P_S = (1/4)[s_o(0) - \Sigma\, \text{Int}]^2 \qquad (5)$$

where $s_o(0)$ represents the peak amplitude (cf. FIG. 6a) and ΣInt is the total of the interference signals, i.e., the maximum noise voltage, under the least favorable conditions.

It is recalled that the signal amplitude $s_o(t)$ is given by the aforestated relationship $$s_o(t) = e^{-\alpha}\ (t/T)^2 \quad (6).$$

Figure 5:
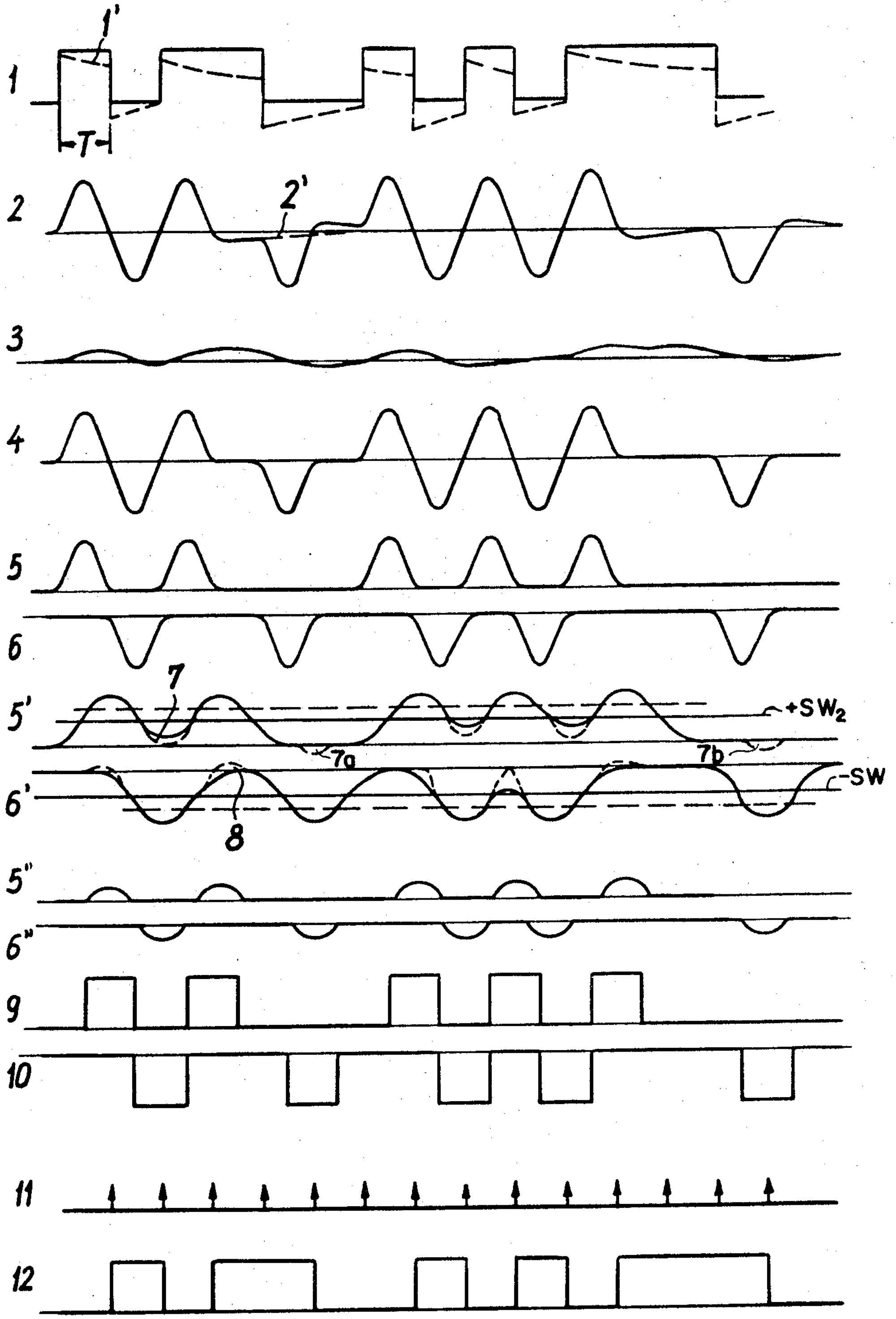
FIG. 5 is a set of graph relating to the operation of the system of FIG. 4.

If the repeater input 602 includes the low-pass filters 406, 407 of FIG. 5 but not the clippers 460, 470 and adders 461, 471, we may (in view of the rapid decay of the Gaussian pulse) equate ΣInt with the trough amplitude $2s_o(T)$ indicated in FIG. *6a;* if the clippers and adders are present, its value reduces to $s_o(T)$.

For the transmission factors L(*f*) and K(*f*) we may assume the following values typical for low-frequency cables:

$$L(f) = e^{-4\sqrt{Tf}} \quad (7)$$

and $$K(f) = (F\cdot f)/100^{0.75} \quad (8).$$

From equation (5) we obtain, as an expression for the signal-to-noise ratio, the ratio $P_S/P_R$ as a function of $\alpha$ according to the formula $$P_s/P_R = [s_o(0) - \Sigma\mathrm{Int}]^2/4P_R \quad (9)$$

wherein PR has the form given in equation (4), with $S_o(f)$ derived by Fourier analysis from $s_o(t)$ as per equation (6).

Let us now distinguish between the three cases in which the repeater input 602 contains at 605 a. only the filter 401, as shown in FIG. 3;

b. also the low-pass filters 406 and 407 of FIG. 4;

c. supplementally, the clippers 460, 470 and adders 461, 471.

The value of $\alpha$ is so chosen in each instance as to yield the desired waveform according to graph 2, graphs 5' and 6', or graphs 7 and 8, respectively.

In Case (*a*), with $\alpha = 8$, we obtain a ratio $P_S/P_R \approx 10$ *d*B.

In Case (*b*), with $\alpha = 2$, we obtain a ratio $P_S/P_R \approx 21.5$ *d*B. This value of $\alpha$ is an optimum inasmuch as both lower and higher values reduce the signal-to-noise ratio; thus, while a smaller $\alpha$ improves the suppression of high-frequency signals, the resulting overlap and prolonged instability entail an impairment of the overall ratio.

In Case (*c*), with $\alpha = 1.15$, we obtain a ratio $P_R/P_S \approx 25$ *d*B. The choice $\alpha \approx 1.15$ represents a limiting value which broadens the regeneration pulses to such an extent that a pulse peaking at $5 = 0$ just goes to zero at $t = \pm 2T$, thereby avoiding any effect upon the peak amplitudes of the next-following pulse despite overlapping. It will be apparent that the superposition of the pulse KP (FIG. *6a*), whose width does not exceed T, would not prevent a distortion of the next pulse if the decay period were greater than 2T; in such an event, therefore, a succession of overlapping pulses could develop cumulative amplitude shifts eventually surpassing the threshold of the voltage sensor.

Thus, the simple system of FIG. 3 is relatively susceptible to high-frequency interference even though its ability to suppress low-frequency noise is excellent, as discussed in connection with FIG. **1*e*. In the more sophisticated embodiment of FIG. 4, the inclusion of filters 406, 407** improves the signal-to-noise ratio by about 11.5 *d*B whereas the presence of components 460, 461, 470, 471 adds a further margin of 3.5 *d*B. Naturally, these values are given merely by way of example for the specific instance of a low-frequency cable, as explained with reference to equations (7) and (8), and would be different in the case of other types of transmission paths (e.g. radio links).

In FIG. 7 I have shown details of the various components of the repeater of FIG. 4 (except for the timing stage 409) according to a preferred embodiment. Filter 401 comprises a linear amplifier 805 whose input circuit is a damped series-resonant network tuned substantially to the frequency ½T, this network consisting of a series capacitor 801, a shunt resistor 804 and an inductor 802 bridged by a resistor 803 in the shunt arm. Amplifier 805 also has a decoupling function.

The adder 404 of compensating stage 402 is shown as an operational amplifier 810 with an RC network 806, 807 and a pair of summing resistors 808, 809 in its input and with a feedback resistor 811; as is well known, such an amplifier develops an output voltage $-U_a \approx U_{e1}\cdot R_3/R_1 + U_{e2}\cdot R_3/R_2$ where $U_{e1}$ is the output voltage of amplifier 805, $U_{e2}$ is the signal voltage at the junction of resistor 806 with condenser 807, $R_1$ is the resistance of summing resistor 808, $R_2$ is the resistance of summing resistor 809 and $R_3$ is the resistance of feedback resistor 811.

Amplifier 810 works into the separating stage 405 whose nonlinear impedances are represented by a pair of oppositely poled diodes 812, 813 grounded by way of respective biasing resistors 814 and 815. It may be assumed that these diodes have only a negligible forward resistance, i.e., that the voltage drop developed thereacross is a small fraction of the signal amplitude in the output of operational amplifier 810. If this is not the case, the forward drop may be compensated in a simple manner by including these diodes in two separate feedback circuits of the operational amplifier, as illustrated in FIG. **7*a* where the feedback resistor 811 is omitted and a common terminal of biasing resistors 814, 815 is returned to the input of amplifier 810.**

Two summing amplifiers 830 and 840, each similar to the operational amplifier 810, represent the elements 406, 407, 461 and 471 of FIG. 4. In order to provide the desired low-pass characteristic, summing impedances 816 and 818 of these amplifiers are of complex character and have been illustrated as conventional reactive T-sections with inductive series arms and capacitive shunt arms. Each amplifier 830, 840 also has an ohmic summing resistor 820, 821 cross-connected to the output of the other amplifier in series with a respective Zener diode 823, 822 forming part, together with associated biasing resistors 824, 825, of the clipping stage 460, 470. Feedback resistors 817 and 819 are also purely ohmic.

The two regenerator stages 408, 418 (including a flip-flop 421 in FIG. 4) are jointly represented by a flip-flop 890 having a setting input J, a resetting input K and a common enabling input M, the latter being connected to the output of timer 409 delivering the periodic synchronization pulses 11 (FIG. 5). Setting input J, supplied from amplifier 830 via an inverter 880, and resetting input K, supplied directly from amplifier 840, are biased to respond only to voltage levels (both positive in the instant case) surpassing the threshold $SW_2$ of FIG. 6*a*. Regeneration pulses clearing the diode 812 (train 5'), after a double polarity inversion at 830 and 880, therefore give rise to an output voltage on a lead 891 whereas pulses clearing the diode 813 (train 6' ), inverted at 840, stop the transmission of such voltage. If the signal amplitude is less than the threshold, the condition of the flip-flop 890 does not change. Thus, there appears on lead 891 the signal 12 (FIG. 5) duplicating the original code signal.

I claim:

1. A regenerative transmission system for binary signals represented by a recurrent switchover between a first and a second voltage level at intervals equaling a whole number of basic pulse periods T, including at least one repeater inserted in a transmission path for said signals, said repeater comprising an input circuit for incoming signals subject to distortion and an output circuit for the retransmission of such signals in regenerated form; said input circuit including filter stage for cutting off all frequencies substantially lower than ½T whereby voltage changes from said first to said second level and voltage changes from said second to said first level give rise to a succession of sinusoidal half-cycles of opposite polarities separated by low-level voltages in the case of switchover intervals substantially greater than T; said output circuit including bistable means settable by half-cycles of one polarity and resettable by half-cycles of the other polarity generated by said filter stage.

2. A system as defined in claim 1 wherein said repeater further includes an integrating stage, connected to the output of said filter stage for deriving therefrom a slowly varying mean voltage, and additive circuitry ahead of said output circuit for superimposing said means voltage upon said succession of sinusoidal half-cycles with a polarity substantially compensating for deviations of said low-level voltages from zero.

3. A system as defined in claim 2 wherein said integrating stage includes an R/C network, said additive circuitry comprising a summing amplifier with input connections to said network and to said filter stage.

4. A system as defined in claim 1 wherein said repeater further includes nonlinear impedance means between said input and output circuits for splitting said sequence into two unipolar pulse trains of opposite polarities fed to said bistable means over separate signal paths.

5. A system as defined in claim 4, further comprising low-pass filter means in said signal paths with a cutoff frequency not higher than about ½T for effectively broadening the unipolar pulses of each train to at least twice their original width prior to their application to said bistable means.

6. A system as defined in claim 5 wherein said repeater further includes a clipping stage in cascade with said low-pass filter means for cutting caps of maximum width T from the unipolar pulses of one polarity and circuit means for superimposing said caps upon the unipolar pulse train of opposite polarity to increase the effective separation of consecutive pulses of the latter train.

7. A system as defined in claim 6 wherein said nonlinear impedance means, said-low-pass filter means and said clipping means comprise a first diode, a first filter and a first clipper serially connected in one of said signal paths and a second diode, a second filter and a second clipper serially connected in the other of said signal paths, said circuit means including first and second summing circuits in said signal paths ahead of said first and second clippers, respectively, and cross-connections from the outputs of said first and second clippers to the inputs of said second and first summing circuits.

8. A system as defined in claim 7 wherein said first and second summing circuits comprise a pair of operational amplifiers with reactive input impedances forming part of said first and second filters, said cross-connections terminating at the junctions of said reactive input impedances with the corresonding operational amplifiers.

9. A system as defined in claim 7 wherein said first and second clippers are a pair of Zener diodes.

10. A system as defined in claim 4 wherein said repeater includes a source of timing pulses connected to said input circuit for synchronization with the incoming signals, said bistable means comprising a pair of switching stages respectively connected to said signal paths for energization by the unipolar pulses thereof, both said stages being further connected to said source for periodic enablement by said timing pulses.

11. A system as defined in claim 10 wherein said bistable means comprises a flip-flop with a setting input and a resetting input respectively connected to said signal paths, said flip-flop further having a common enabling input connected to said source.

12. A system as defined in claim 1 wherein said filter stage comprises a damped resonant circuit tuned to substantially the frequency ½T.

* * * * *